Patented Aug. 5, 1952

2,605,900

UNITED STATES PATENT OFFICE 2,605,900

REFINING OF VEGETABLE WAX POWDER

Edward A. Wilder and Elbert S. McLoud, Racine, Wis., assignors to S. C. Johnson & Son, Inc., Racine, Wis.

No Drawing. Application May 15, 1948, Serial No. 27,353

5 Claims. (Cl. 209—173)

This invention relates to the manufacture of raw material wax. More specifically, it relates to an improved process for removing known waxy matter from crude vegetable wax powder.

Many vegetable waxes such as esparto grass wax, carnauba wax and ouricury wax are removed from the plants by mechanical means and are, therefore, in the form of crude wax powder containing small particles of crude wax together with particles of other vegetable matter. In the case of carnauba wax, the leaves are cut from the carnauba palm and allowed to dry. The wax largely remains inclosed in the crevices of the dry and shrunken leaves. When the wax powder is removed from the leaves, a large amount of leafy matter becomes mingled with the wax particles. This leafy matter is also in powdered form of a particle size, shape and mass comparable to that of the wax powder from which it can scarcely be distinguished.

Various methods have been proposed for the removal of this leafy matter or borra as it is known in Brazil. One of the most successful of these methods, which is now in commercial use, is that described in U. S. patent to Johnson, Steinle and Gardiner No. 2,275,630. By this method the crude vegetable wax powder is screened through one or more screens of about 40 to 60 mesh, and the fines of the screening operation, which contain the wax, are subjected to a further treatment in a centrifugal air flotation separator whereby additional leafy matter or borra may be reduced from its original content of 20–35% down to a minimum of 12%.

Although the above process has contributed considerably to the production of light-colored wax, nevertheless, the amount of leafy matter or borra which remains tends to darken the wax upon subsequent melting.

In co-pending application, Serial Number 27,354, now Patent No. 2,527,481, a process is described for purifying crude carnauba wax powder by means of a liquid flotation system.

Now in accordance with our invention, we have developed an improved process for removing leafy matter or borra from crude vegetable wax powder. This process, which is limited to the treatment of crude vegetable wax powder which has not been melted in the production thereof, comprises contacting crude vegetable wax powder with water, agitating the wax-water mixture sufficiently to wet the wax, and distribute the wet wax throughout the wax-water mixture, then agitating the wax layer, as it forms on the surface of the water, at a rate sufficient to prevent the entrapping of borra within the structure of the wax layer, and recovering powdered wax from the wax layer.

Now, having indicated in a general way the nature and purpose of this invention, the following examples will illustrate the invention. It is to be understood, however, that such examples are presented merely as illustration of the invention and are not to be construed as limiting the same. In the examples the ingredients are given in parts by weight unless otherwise indicated.

Example 1

Two hundred parts of crude carnauba wax powder, prepared by the method described in U. S. Patent No. 2,275,630 and containing about 15–18% of leafy matter or borra, was charged into an open vessel. The wax powder was thoroughly wet with 520 parts of water with aid of agitation. After the wax had been thoroughly wet, liquid slurry was formed by placing the wax-water mixture in a vessel containing 1560 parts of water. Carefully controlled agitation was then commenced, the paddle or crosspiece of the agitator having been positioned in the slurry at a distance about two-thirds the depth of slurry from the top of the liquid surface. In this position the agitator should be moved at approximately 60 feet per minute, average linear speed, for approximately 10 minutes so as to insure uniformity of wax powder distribution throughout the slurry. A wax layer was found to form on the surface of the slurry. The mechanical agitator is then slowly elevated and its speed gradually reduced so that when agitator crosspiece reaches the surface of the liquid slurry about a half hour later, it should be moving at a linear speed of about 20 feet per minute. This reduction in agitation allows the borra to descend easily to the bottom of the vessel and does not disturb the borra already settled. Agitation is continued at the surface with the agitator crosspiece moving at 20 feet per minute, thereby preventing the wax layer from so thickening as to lock particles of borra within the thickened wax layer. After about an hour of such surface agitation, the wax layer is removed and placed in a permeable basket centrifuge. After about 30 minutes of centrifugal filtration, which reduced the moisture content of the wax from about 70% to 40%, the wax was broken up into small lumps and air-dried in open trays. The borra content of the resulting dried wax powder was reduced to about 2%.

Example 2

Example 1 was repeated but before the resulting wax layer was removed, the liquid slurry was allowed to stand quiescent, without agitation, for about an hour. Less wax particles remained suspended in the intermediate zone between the borra and the surface wax layer than in Example 1. After the wax layer was removed and treated as in Example 1, no appreciable difference of borra content in the dry wax powder was found over the amount shown in Example 1.

Example 3

Two hundred parts of crude carnauba wax powder, prepared by the method disclosed in U. S. Patent No. 2,275,630 and containing about 15–18% of leafy matter or borra, was charged into an open vessel containing 2080 parts of water. The crude wax powder was thoroughly wet by mechanical agitation and such agitation was continued as described in Example 1. The resulting wax-layer was removed and treated as in Example 1. The borra content of the resulting dry wax powder was reduced to about 2%.

In the above examples, there has been illustrated our improved process for removing leafy matter or borra from crude vegetable wax powder. The examples illustrate the treatment of dry crude vegetable wax powder having a borra content of 15–18% which upon treatment was reduced to approximately 2% by the employment of controlled agitation as described.

The wetting of the surface of the dry crude vegetable wax powder is very essential since without it little separation of the borra can take place. As shown in Examples 1 and 2, it is preferred to premix the dry crude vegetable wax powder with at least 2½ times its weight of water and then mechanically agitate the mixture until thorough wetting is achieved. However, as pointed out in Example 3, if desired, the wax may be added directly to a larger body of water, but care should be taken that the wax is added only at such rate that it can be thoroughly wet as it is introduced into the vessel. If excessive wax is placed in the vessel without becoming thoroughly wet, it will ride upon the surface of the liquid and efficient separation of borra from this portion will not be achieved.

Ordinarily in carrying out this process, cold water or water of a temperature of about 20–25° C. may be used. The use of hot water or water of more than 70° C. sometimes results in emulsification of the wax in the water and interferes with an efficient separation of the borra from the wax. Therefore, the use of water of a temperature of not more than 70° C. is recommended.

While in the examples the total volume of water to wax is about 10:1 by weight, it should be realized that this ratio may be varied. While it is recommended that approximately 10 parts of water to 1 part of wax by weight be used, the ratio of water to wax may be increased over that amount, but the addition of excessive amounts of water provides additional recovery problems.

It has been found that a ratio of about 2½ parts of water per part of wax by weight provides adequate water for wetting. Less than this amount will result in incomplete wetting and thus reduce the efficiency of the separation of the borra.

In the examples, the agitator crosspiece was employed in a position two-thirds the depth of the slurry for approximately 10 minutes and was gradually elevated during a 30 minute interval. It will be understood that this depth and period of agitation are not critical, but must lie in a range wherein effectual and thorough distribution of the wax as a suspension in water will be attained. It is recommended that the aggitation be started somewhere in the lower half of the liquid slurry and maintained for an initial period of 5 to 12 minutes in such position. For this initial agitation the crosspiece should be moving at 50 to 70 feet per minute, linear speed, to produce the best results. This speed, as well as the 20 feet per minute recommended for surface agitation may be varied, depending upon the size and type of agitator used.

Various types and sizes of agitator crosspieces may be employed, but we have found it expedient to use a rotating "rake-like" agitator. The action given the slurry by the projecting "teeth" of this type of agitator prevents the wax layer from packing tightly or thickening excessively. The structure or type of agitator is chosen to accomplish its purpose while creating a minimum of turbulence in the slurry. If desired, liquid pumps and gas streams can be used to accomplish the same agitation.

While the examples have illustrated the separation of leafy matter or borra from crude carnauba wax powder, it will be understood that this process is equally applicable to other vegetable wax powders such as asparto grass wax, and ouricury wax which are obtained from the plant fibers in the form of a powder.

The moisture content of the wax layer was shown as about 70%. This will vary over a considerable range from a quite firm wax layer to a creamy fluid. The reduction in moisture content from 70% to 40% by centrifugal or other filtration was sufficient to open the capillaries of the wax powder so that rapid air drying could be achieved.

By the practising of our invention, a light-colored wax is obtained which greatly increases the commercial uses of the vegetable wax. It is anticipated that the dry vegetable wax powder will be treated with adsorbents and melted, thus obtaining a wax of sufficient lightness to eliminate the necessity of bleaching with chemicals which are well known in the art. While chemical bleaching agents often provide a lightness of color, the resulting alteration of the structural and chemical nature of the original wax is detrimental where the particular characteristics of the original wax are desired.

We claim:

1. A process for purifying crude vegetable wax powder which has not been melted in the production thereof, comprising contacting crude vegetable wax powder with water in a suitable vessel, said water being of a temperature of not more than 70° C., the ratio between said wax and water being at least 2½ parts of water per part of wax, agitating the wax-water mixture at a point substantially below the surface of said mixture and in a manner sufficient to wet said wax and distribute said wax throughout the entire vessel, bringing the agitating media to the surface of the mixture, while simultaneously gradually reducing the speed thereof, agitating the wax layer as it forms on the surface of said mixture at a rate less than half that employed in said below-surface agitation, said rate being sufficient to prevent entrapping of borra within the structure of said wax layer, recovering powdered wax from said wax layer.

2. A process for purifying crude carnauba wax powder which has not been melted in the production thereof, comprising contacting crude carnauba wax powder with water in a suitable vessel, said water being of a temperature of not more than 70° C., the ratio between said wax and water being at least 2½ parts of water per part of wax, agitating the wax-water mixture at a point substantially below the surface of said mixture and in a manner sufficient to wet said wax and distribute said wax throughout the entire vessel, bringing the agitating media to the surface of the mixture while simultaneously gradually reducing the speed thereof, agitating the wax layer as it forms on the surface of said mixture at a rate less than half that employed in said below-surface agitation, said rate being sufficient to prevent entrapping of borra within the structure of said wax layer, recovering powdered wax from said wax layer.

3. A process for purifying crude vegetable wax powder which has not been melted in the production thereof, comprising contacting crude vegetable wax powder with water in a suitable vessel, said water being of a temperature of not more than 70° C., the ratio between said wax and water being at least 2½ parts of water per part of wax, increasing the amount of water in said mixture until a liquid slurry is formed, agitating said slurry at a point substantially below the surface of said slurry in a manner to distribute said wax throughout the entire vessel, bringing the agitating media to the surface of the mixture while simultaneously gradually reducing the speed thereof, agitating the wax layer as it forms on the surface of said mixture at a rate less than half that employed in said below-surface agitation, said rate being sufficient to prevent entrapping of borra within the structure of said wax layer, recovering powdered wax from said wax layer.

4. A process for purifying crude carnauba wax powder which has not been melted in the production thereof, comprising contacting crude carnauba wax powder with water in a suitable vessel, said water being of a temperature of not more than 70° C., the ratio between said wax and water being at least 2½ parts of water per part of wax, increasing the amount of water in said mixture until a liquid slurry is formed, agitating said slurry at a point substantially below the surface of said slurry in a manner to distribute said wax throughout the entire vessel, bringing the agitating media to the surface of the mixture while simultaneously gradually reducing the speed thereof, agitating the wax layer as it forms on the surface of said mixture at a rate less than half that employed in said below-surface agitation, said rate being sufficient to prevent entrapping of borra within the structure of said wax layer, recovering powdered wax from said wax layer.

5. A process for purifying crude vegetable wax powder which has not been melted in the production thereof, comprising contacting crude vegetable wax powder with water in a suitable vessel, said water being of a temperature of not more than 70° C., the ratio between said wax and water being at least 2½ parts of water per part of wax, agitating the wax-water mixture at a point substantially below the surface of said mixture and in a manner sufficient to wet said wax and distribute said wax throughout the entire vessel, bringing the agitating media to the surface of the mixture while simultaneously gradually reducing the speed thereof, agitating the wax layer as it forms on the surface of said mixture at a rate less than half that employed in said below-surface agitation, said rate being sufficient to prevent entrapping of borra within the structure of said wax layer, allowing said mixture to remain quiescent until a firmer wax layer is formed on the surface of said water, recovering powdered wax from said wax layer.

EDWARD A. WILDER.
ELBERT S. McLOUD.

REFERENCES CITED

The following references are of record in the file of this patent:

UNITED STATES PATENTS

| Number | Name | Date |
|---|---|---|
| 556,111 | Talbot | Mar. 10, 1896 |
| 1,842,002 | Zschoch et al. | Jan. 19, 1932 |
| 2,136,280 | Dickinson | Nov. 8, 1938 |
| 2,136,281 | Dickinson | Nov. 8, 1938 |
| 2,310,492 | Nagelvoort | Feb. 9, 1943 |
| 2,527,481 | Johnson et al. | Oct. 24, 1950 |
| 2,530,676 | Berg et al. | Nov. 21, 1950 |

OTHER REFERENCES

Bennett-Commercial Waxes (1944), Chem. Pub. Company, pages 74 to 76.